US008227540B2

United States Patent
Priedeman et al.

(10) Patent No.: US 8,227,540 B2
(45) Date of Patent: *Jul. 24, 2012

(54) SOLUBLE MATERIAL AND PROCESS FOR THREE-DIMENSIONAL MODELING

(75) Inventors: William R. Priedeman, Long Lake, MN (US); Andrea L. Brosch, Eden Prairie, MN (US)

(73) Assignee: Stratasys, Inc., Eden Prairie, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 12/833,433

(22) Filed: Jul. 9, 2010

(65) Prior Publication Data

US 2010/0270707 A1    Oct. 28, 2010

Related U.S. Application Data

(63) Continuation of application No. 10/898,814, filed on Jul. 26, 2004, now Pat. No. 7,754,807, which is a continuation-in-part of application No. 10/019,160, filed as application No. PCT/US00/10592 on Apr. 19, 2000, now Pat. No. 6,790,403.

(60) Provisional application No. 60/130,165, filed on Apr. 20, 1999.

(51) Int. Cl.
*C08L 31/02* (2006.01)
*C08L 33/12* (2006.01)
*C08F 20/06* (2006.01)
*C08F 118/02* (2006.01)
*B06B 1/02* (2006.01)

(52) U.S. Cl. ............... 524/556; 524/560; 526/317.1; 526/319; 264/442; 264/308; 264/317

(58) Field of Classification Search ............... 524/556, 524/560; 526/317.1, 319; 264/442, 308, 264/317
See application file for complete search history.

(56) References Cited

U.S. PATENT DOCUMENTS

| 3,016,451 A | 1/1962 | Cornell, Jr. |
| 3,239,586 A * | 3/1966 | Adams .................. 264/123 |
| 3,381,812 A | 5/1968 | Cohen |
| 3,841,000 A | 10/1974 | Simon |
| 3,917,090 A | 11/1975 | Montagnino |
| 4,152,367 A | 5/1979 | Binsack et al. |
| 4,397,986 A | 8/1983 | Hornbaker |
| 4,551,369 A | 11/1985 | Belz |
| 4,665,492 A | 5/1987 | Masters |

(Continued)

FOREIGN PATENT DOCUMENTS

DE    19639347 A1    3/1998

(Continued)

OTHER PUBLICATIONS

Rudolstadt, Werk et al: "Belland Alkaline Soluble Polymers", Belland Technology, Belland Material, pp. 1-15.

(Continued)

*Primary Examiner* — Michael M Bernshteyn
(74) *Attorney, Agent, or Firm* — Brian R. Morrison; Westman, Champlin & Kelly, P.A.

(57) ABSTRACT

The present invention is a composition for making a three-dimensional object. The composition comprises a plasticizer and a base polymer, where the base polymer comprises a carboxylic acid, where the composition is soluble in an alkaline solution.

12 Claims, 2 Drawing Sheets

U.S. PATENT DOCUMENTS

| | | |
|---|---|---|
| 4,671,982 A | 6/1987 | Belz |
| 4,749,347 A | 6/1988 | Valavaara |
| 4,844,373 A | 7/1989 | Fike, Sr. |
| 4,870,148 A | 9/1989 | Belz et al. |
| 4,886,856 A | 12/1989 | Chen et al. |
| 4,898,314 A | 2/1990 | Stroh |
| 4,928,897 A | 5/1990 | Satou et al. |
| 4,961,154 A | 10/1990 | Pomerantz et al. |
| 5,059,266 A | 10/1991 | Yamane et al. |
| 5,121,329 A | 6/1992 | Crump |
| 5,134,569 A | 7/1992 | Masters |
| 5,136,515 A | 8/1992 | Helinski |
| 5,140,937 A | 8/1992 | Yamane et al. |
| 5,149,548 A | 9/1992 | Yamane et al. |
| 5,169,081 A | 12/1992 | Goedderz |
| 5,204,055 A | 4/1993 | Sachs et al. |
| 5,216,616 A | 6/1993 | Masters |
| 5,257,657 A | 11/1993 | Gore |
| 5,263,585 A | 11/1993 | Lawhon et al. |
| 5,293,996 A | 3/1994 | Duncan |
| 5,303,141 A | 4/1994 | Batchelder et al. |
| 5,312,224 A | 5/1994 | Batchelder et al. |
| 5,317,043 A | 5/1994 | Gass |
| 5,322,878 A | 6/1994 | Deibig et al. |
| 5,336,755 A | 8/1994 | Pape |
| 5,340,433 A | 8/1994 | Crump |
| 5,346,955 A | 9/1994 | Sasse et al. |
| 5,378,751 A | 1/1995 | Deibig et al. |
| 5,402,351 A | 3/1995 | Batchelder et al. |
| 5,474,719 A | 12/1995 | Fan et al. |
| 5,500,263 A | 3/1996 | Rober et al. |
| 5,503,785 A | 4/1996 | Crump et al. |
| 5,587,913 A | 12/1996 | Abrams et al. |
| 5,594,652 A | 1/1997 | Penn et al. |
| 5,653,925 A | 8/1997 | Batchelder |
| 5,695,707 A | 12/1997 | Almquist et al. |
| 5,738,817 A | 4/1998 | Danforth et al. |
| 5,764,521 A | 6/1998 | Batchelder et al. |
| 5,765,740 A | 6/1998 | Ferguson |
| 5,779,561 A * | 7/1998 | Sullivan et al. ............ 473/373 |
| 5,807,437 A | 9/1998 | Sachs et al. |
| 5,814,697 A * | 9/1998 | Akao et al. ................ 524/495 |
| 5,863,885 A | 1/1999 | Ruggieri et al. |
| 5,866,058 A | 2/1999 | Batchelder et al. |
| 5,893,404 A | 4/1999 | Mendez et al. |
| 5,900,207 A | 5/1999 | Danforth et al. |
| 5,932,055 A | 8/1999 | Newell et al. |
| 5,939,008 A | 8/1999 | Comb et al. |
| 5,943,235 A | 8/1999 | Earl et al. |
| 5,968,561 A | 10/1999 | Batchelder et al. |
| 6,004,124 A | 12/1999 | Swanson et al. |
| 6,022,207 A | 2/2000 | Dahlin et al. |
| 6,027,068 A | 2/2000 | Lantsman |
| 6,054,077 A | 4/2000 | Comb et al. |
| 6,067,480 A | 5/2000 | Stuffle et al. |
| 6,070,107 A | 5/2000 | Lombardi et al. |
| 6,085,957 A | 7/2000 | Zinniel et al. |
| 6,095,323 A | 8/2000 | Ferguson |
| 6,119,567 A | 9/2000 | Schindler et al. |
| 6,127,492 A | 10/2000 | Nagashima et al. |
| 6,129,872 A | 10/2000 | Jang |
| 6,133,355 A | 10/2000 | Leyden et al. |
| 6,162,378 A | 12/2000 | Bedal et al. |
| 6,165,406 A | 12/2000 | Jang et al. |
| 6,175,422 B1 | 1/2001 | Penn et al. |
| 6,193,923 B1 | 2/2001 | Leyden et al. |
| 6,214,279 B1 | 4/2001 | Yang et al. |
| 6,228,923 B1 | 5/2001 | Lombardi et al. |
| 6,257,517 B1 | 7/2001 | Babish et al. |
| 6,261,077 B1 | 7/2001 | Bishop et al. |
| 6,322,728 B1 | 11/2001 | Brodkin et al. |
| 6,572,228 B2 | 6/2003 | Kaga et al. |
| 6,572,807 B1 | 6/2003 | Fong |
| 6,645,412 B2 | 11/2003 | Priedeman, Jr. |
| 6,685,866 B2 | 2/2004 | Swanson et al. |
| 6,722,872 B1 | 4/2004 | Swanson et al. |
| 6,730,252 B1 | 5/2004 | Teoh et al. |
| 6,790,403 B1 | 9/2004 | Priedeman, Jr. et al. |
| 6,814,907 B1 | 11/2004 | Comb |
| 6,907,307 B2 | 6/2005 | Chen et al. |
| 6,923,634 B2 | 8/2005 | Swanson et al. |
| 7,077,638 B2 | 7/2006 | Leyden et al. |
| 7,255,821 B2 | 8/2007 | Priedeman, Jr. et al. |
| 7,648,609 B2 | 1/2010 | Leder et al. |
| 7,754,807 B2 | 7/2010 | Priedeman, Jr. et al. |
| 2003/0090752 A1 | 5/2003 | Rosenberger et al. |
| 2004/0222561 A1 | 11/2004 | Hopkins |
| 2005/0004282 A1 | 1/2005 | Priedeman, Jr. et al. |
| 2005/0103360 A1 | 5/2005 | Tafoya |
| 2005/0129941 A1 | 6/2005 | Comb et al. |
| 2005/0133155 A1 | 6/2005 | Leder et al. |
| 2005/0173838 A1 | 8/2005 | Priedeman, Jr. et al. |
| 2007/0003656 A1 | 1/2007 | LaBossiere et al. |
| 2007/0228590 A1 | 10/2007 | LaBossiere et al. |
| 2008/0213419 A1 | 9/2008 | Skubic et al. |
| 2009/0035405 A1 | 2/2009 | Leavitt |
| 2010/0096072 A1 | 4/2010 | Hopkins et al. |

FOREIGN PATENT DOCUMENTS

| | | |
|---|---|---|
| EP | 0742585 A1 | 11/1996 |
| EP | 0928316 A1 | 7/1999 |
| GB | 816016 | 7/1959 |
| WO | 9813423 A1 | 4/1998 |
| WO | 0062994 A1 | 10/2000 |
| WO | 0078519 A1 | 12/2000 |
| WO | 0206029 A1 | 1/2002 |
| WO | 02093360 A1 | 11/2002 |
| WO | 2004003823 A1 | 1/2004 |
| WO | 2006022528 A1 | 3/2006 |

OTHER PUBLICATIONS

Belland Material Brochure, Innocycling GmbH & Co. KG.
LOTADER AX 8840, Copolymer Ethylene-Glycidyl Methacrylate, Arkema Technical Polymers Division, (Jul. 2005), 2 pages.
LOTADER GMA, Arkema, (Jan. 2001), 2 pages.
Feenstra, F. K., "High Temperature Fused Deposition Modelling: An Experimental Study Focusing on Modelling Materials", Time-Compression Technologies '98 Conferences, Oct. 13-14, 1998, Nottingham, United Kingdom.
Rudolstadt, Werk et al., "Belland Alkaline Soluble Polymers", Belland Technology, Belland Material, (Dec. 2009), pp. 1-15.
Belland Material Brochure, Innocycling GmbH & Co. KG, (Feb. 2008).

* cited by examiner

SOLUBLE MATERIAL AND PROCESS FOR THREE-DIMENSIONAL MODELING

CROSS-REFERENCE TO RELATED APPLICATION(S)

This application is a continuation of U.S. patent application Ser. No. 10/898,814, filed on Jul. 26, 2004, which is a continuation-in-part of U.S. patent application Ser. No. 10/019,160, filed on Oct. 19, 2001. U.S. patent application Ser. No. 10/019,160 is a national phase of International Patent Application No. PCT/US00/010592, filed on Apr. 19, 2000, which claims priority to U.S. Provisional Patent Application No. 60/130,165, filed on Apr. 20, 1999. The disclosures of the above-listed applications are incorporated by reference in their entireties.

BACKGROUND

This invention relates to the fabrication of three-dimensional objects using additive process modeling techniques. More particularly, the invention relates to forming three-dimensional objects by depositing solidifiable material in a predetermined pattern and providing support structures to support portions of such a three-dimensional object as it is being built.

Additive process modeling machines make three-dimensional models by building up a modeling medium, based upon design data provided from a computer aided design (CAD) system. Three-dimensional models are used for functions including aesthetic judgments, proofing the mathematical CAD model, forming hard tooling, studying interference and space allocation, and testing functionality. One technique is to deposit solidifiable modeling material in a predetermined pattern, according to design data provided from a CAD system, with the build-up of multiple layers forming the model.

Examples of apparatus and methods for making three-dimensional models by depositing layers of solidifiable modeling material from an extrusion head are described in Crump U.S. Pat. No. 5,121,329, Batchelder, et al. U.S. Pat. No. 5,303,141, Crump U.S. Pat. No. 5,340,433, Batchelder, et al. U.S. Pat. No. 5,402,351, Danforth, et al. U.S. Pat. No. 5,738,817, Batchelder, et al. U.S. Pat. No. 5,764,521 and Swanson et al. U.S. Pat. No. 6,004,124, all of which are assigned to Stratasys, Inc. of Eden Prairie, Minn., the assignee of the present invention. The modeling material may be supplied to the extrusion head in solid form, for example in the form of a flexible filament wound on a supply reel or in the form of a solid rod, as disclosed in U.S. Pat. No. 5,121,329. As described in U.S. Pat. No. 4,749,347, modeling material may alternatively be pumped in liquid form from a reservoir. In any case, the extrusion head extrudes molten modeling material from a nozzle onto a base. The extruded material is deposited layer-by-layer in areas defined from the CAD model. A solidifiable material which adheres to the previous layer with an adequate bond upon solidification is used as the modeling material. Thermoplastic materials have been found particularly suitable for these deposition modeling techniques.

Examples of apparatus and methods for making three-dimensional models by depositing solidifiable material from a jetting head are described, for example, in Helinski U.S. Pat. No. 5,136,515, Masters U.S. Pat. No. 4,665,492 and Masters U.S. Pat. No. 5,216,616. Particles are directed to specific locations in a predetermined pattern as defined by a CAD model, and deposited and built up to construct the desired object.

In creating three-dimensional objects by additive process techniques, such as by depositing layers of solidifiable material, it is the rule rather than the exception that supporting layers or structures must be used underneath overhanging portions or in cavities of objects under construction, which are not directly supported by the modeling material itself. For example, if the object is a model of the interior of a subterranean cave and the cave prototype is constructed from the floor towards the ceiling, then a stalactite will require a temporary support until the ceiling is completed. Support layers or structure may be required for other reasons as well, such as allowing the model to be removed from a base, resisting a tendency for the model to deform while partially completed, and resisting forces applied to a partially completed model by the construction process.

A support structure may be built utilizing the same deposition techniques and apparatus by which the modeling material is deposited. The apparatus, under appropriate software control, produces additional geometry acting as a support structure for the overhanging or free-space segments of the object being formed. Support material is deposited either from a separate dispensing head within the modeling apparatus, or by the same dispensing head that deposits modeling material. The support material is chosen so that it adheres to the modeling material. Anchoring the model to such support structures solves the problem of building the model, but creates the additional problem of removing the support structure from the finished model without causing damage to the model.

The problem of removing the support structure has been addressed by forming a weak, breakable bond between the model and the support structure, such as is described in Crump, et al. U.S. Pat. No. 5,503,785. The '785 patent discloses a process by which a material that forms a weak, breakable bond with the modeling material is selected as a release material. The release material is deposited along the interface between the object and its support structure in a layered fashion or as a coating, permitting the support structure to be broken away after formation of the object. The support structure may be formed of the modeling material or it may be formed of the release material.

The '785 patent discloses various combinations of materials that may be used as modeling and release materials. For instance, the '785 patent discloses that a soluble release material may be utilized, so that any such material remaining on the model after the support is broken away can be removed by placing the model in a bath. Water soluble wax, polyethylene oxide and glycol-based polymers, polyvinyl pyrrolidone-based polymers, methyl vinyl ether, maleic acid-based polymers, polyoxazoline-based polymers and polyquaternium II are disclosed, as well as solvent-soluble acrylates and stearic and azelaic acids. Soluble supports can eliminate scarring of the model surface and the need to use force in removing supports.

In extrusion based systems, a variation of applying release material in layers has been implemented, in which the release material is applied in short bead segments (termed "perforations") between the support structure and the model under construction. The perforations reduce adhesion of the support layer by limiting the area of contact with the model, to aid in the removal of breakaway supports.

There is a continuing need to provide a support structure that releases from a three-dimensional model without the application of force and that will not mar the model surface finish, and that further has good mechanical strength and is compatible with the modeling process and the modeling material.

SUMMARY

A first aspect of the present disclosure is directed to a support material feedstock for making a support structure for a three-dimensional object using an additive processing technique. The support material feedstock includes a composition having at least one copolymer and at least one plasticizer, where the composition is soluble in an aqueous liquid. The at least one copolymer includes a plurality of pendent carboxylic acid groups, and a plurality of pendent ester groups. The support material feedstock also has a filament geometry configured to be received by a filament-fed extrusion system configured to make the support structure in coordination with the three-dimensional object using the additive processing technique.

Another aspect of the present disclosure is directed to a method of forming a feedstock for making a support structure. The method includes providing at least one copolymer having a plurality of pendent carboxylic acid groups and a plurality of pendent ester groups, where the plurality of pendent carboxylic acid groups constitute from about 15.0% to about 60.0% by weight of pendent groups of the copolymer, based on a total weight of the pendent groups of the at least one copolymer. The method also includes combining the at least copolymer with at least one plasticizer to form a composition, the at least one plasticizer constituting from about 10% by weight to about 30% by weight of the composition, and where the composition is soluble in an aqueous liquid. The method further includes forming the feedstock from the composition, where the formed feedstock has a filament geometry that is configured to be received by a filament-fed extrusion system configured to make the support structure in coordination with a three-dimensional object using an additive processing technique.

DETAILED DESCRIPTION

The process of the present invention employing an alkali-soluble thermoplastic material is applicable for use in three-dimensional modeling systems which deposit molten modeling material that solidifies to form an object.

The present invention is described with reference to a deposition modeling system of the type disclosed in U.S. Pat. Nos. 5,121,329 and 6,004,124, which are hereby incorporated by reference as if set forth fully herein. In the described embodiment, the modeling material and the support material are deposited as substantially continuous strands layer-by-layer from an extrusion head and are supplied to the extrusion head in the form of a flexible filament. It will be understood by those skilled in the art that the invention can be practiced with advantage in various other types of modeling machines as well, and that the materials may be supplied in alternative forms, such as a liquid, solid rod, pellet or granulated form.

Figure 1:
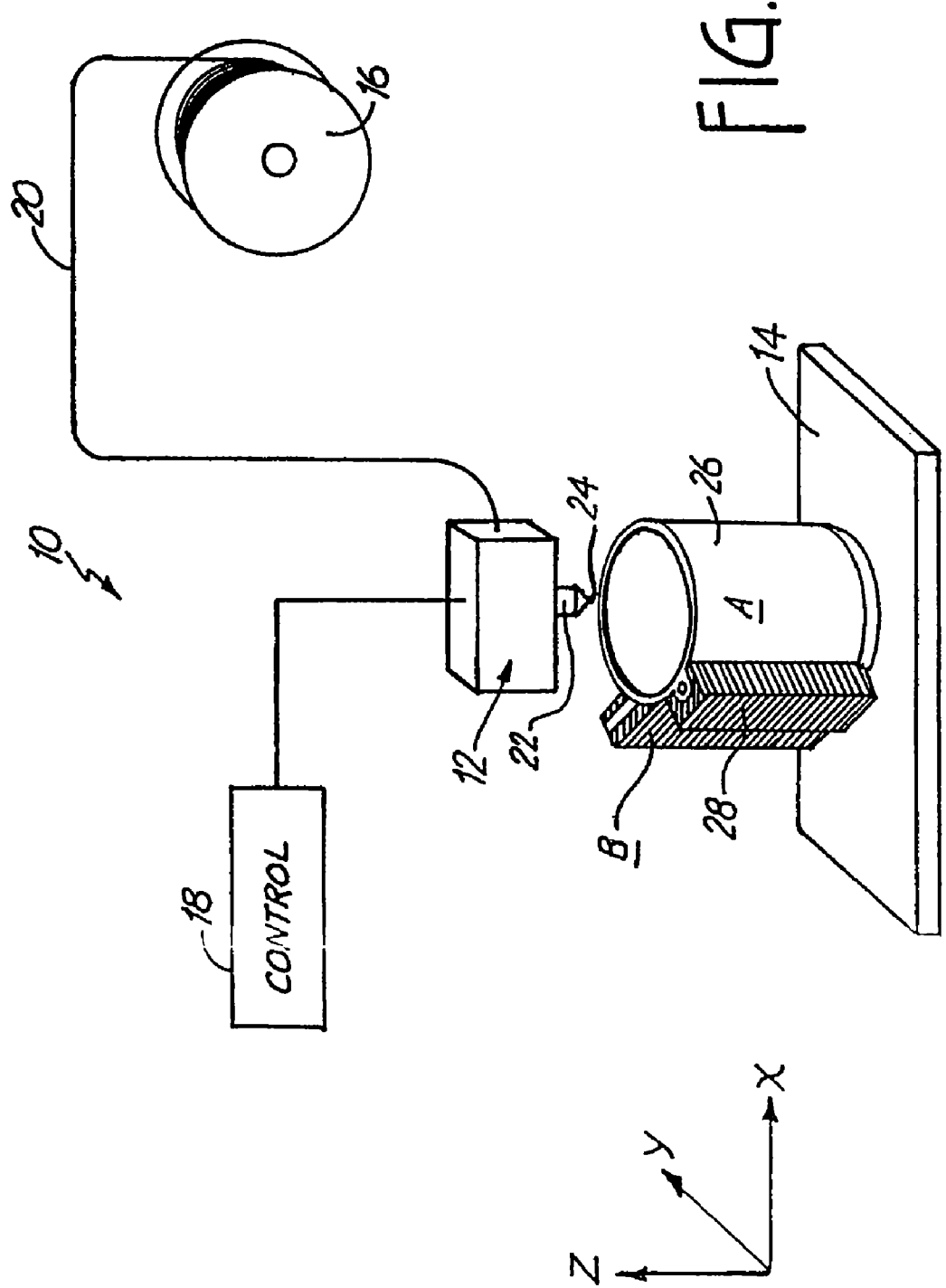
FIG. 1 is a diagrammatic illustration of a model formed by a filament-feed extrusion apparatus using the alkali-soluble material of the present invention as a support structure.

FIG. 1 shows an extrusion apparatus 10 building a model 26 supported by a support structure 28 according to the present invention. The extrusion apparatus 10 includes an extrusion head 12, a material-receiving base 14, a filament supply spool 16 and a control 18. Examples of suitable systems for the extrusion apparatus 10 include Stratasys FDM® systems, such as Stratasys FDM® 1650, Stratasys FDM® 2000, Stratasys FDM® Titan, Stratasys FDM® Vantage, and Stratasys FDM® Maxum; and "Dimension SST 3D Printer"; all available from Stratasys, Inc., Eden Prairie, Minn.

Extrusion head 12 moves in X and Y directions with respect to base 14, which moves in a vertical or Z direction. Supply spool 16 supplies a flexible filament 20 to extrusion head 12. Filament 20 typically follows a rather tortuous path through extrusion apparatus 10, and is advanced towards extrusion head 12 by means of stepper motor-driven pinch rollers. Filament 20 is melted in a liquifier 22, carried by extrusion head 12. The liquifier 22 heats the filament to a temperature slightly above its solidification point, reducing it to a molten state. Molten material is extruded through an orifice 24 of liquifier 22 onto base 14.

The extrusion apparatus 10 of the disclosed embodiment has no positive cut-off valve for stopping flow of the molten material through orifice 24 when a layer or a pass is complete. The flow is stopped by ceasing to advance filament 20 into extrusion head 12. The flow rate at which the molten material is dispensed onto base 14 is determined by a combination of the orifice size and the rate at which filament 20 is advanced into extrusion head 12.

The movement of extrusion head 12 is controlled by control 18 so as to deposit material onto base 14 in multiple passes and layers to build three-dimensional model 26 having a shape determined by stored CAD data and further to build support structure 28 defined so as to physically support the model 26 as it is being built. The model 26 and its support structure 28 are built up on the base 14 within a build envelope having an environment controlled to promote solidification. A first layer of the deposited material adheres to the base so as to form a foundation, while subsequent layers of material adhere to one other. A base that has been successfully used is a polymer foam removably mounted to a platform. Other materials that may serve as a base include sandpaper formed of a fine wire mesh screen coated with sand and adhered to a platform, a water-soluble wax, a foam plastic material, and an acrylic sheet mounted to a vacuum platen.

A modeling material A is dispensed to form the model 26. An alkali-soluble support material B is dispensed in coordination with the dispensing of modeling material A to form the support structure 28. For convenience, the extrusion apparatus 10 is shown with only one filament supply spool 16 providing a single filament 20. It should be understood, however, that in the practice of the present invention using a filament-feed apparatus such as disclosed herein the modeling material A and the alkali-soluble support material B are provided to the extrusion apparatus 10 on separate filament supply spools. The extrusion apparatus 10 may then accommodate the dispensing of two different materials by: (1) providing two extrusion heads 12, one supplied with modeling material A and one supplied with modeling material B (such as is disclosed in the '124 patent); (2) providing a single extrusion head supplied with both the modeling material A and the alkali-support material B, with a single nozzle for dispensing both materials (such as shown in FIG. 6 of the '329 patent); or (3) providing a single extrusion head supplied with both materials, with each material dispensed through a separate nozzle (such as shown in FIG. 6 of the '785 patent).

Modeling material A is typically a thermoplastic material that can be heated relatively rapidly from a solid state to a predetermined temperature above the solidification temperature of the material, and preferably has a relatively high tensile strength. An acrylonitrile-butadiene-styrene (ABS) composition is one particularly suitable modeling material.

Other materials that may be used for the modeling material A include a variety of waxes, paraffin, a variety of thermoplastic resins, metals and metal alloys. Glass and chemical setting materials, including two-part epoxies, would also be suitable.

Alkali-soluble support material B of the present invention is a thermoplastic soluble in an alkaline solution, as described in more detail below. Alkali-soluble support material B likewise can preferably be heated relatively rapidly from a solid state filament to a predetermined temperature above the solidification temperature of the material, and solidify upon a drop in temperature after being dispensed.

The soluble support structure 28 created with support material B may be formed in a known manner, such as disclosed in U.S. Pat. No. 5,503,785, which is hereby incorporated by reference as if set forth fully herein. FIGS. 3-5 of the '785 patent illustrate a removable support structure. As shown in FIG. 1 herein, the support structure 28 may be built entirely out of the support material B. Or, as shown and described in the '785 patent, the alkali-soluble support material B may form a dissolvable joint between the model formed of modeling material A and a support structure formed of the same material A. The joint can be a release layer or layers, or a thin coating.

Figure 2:
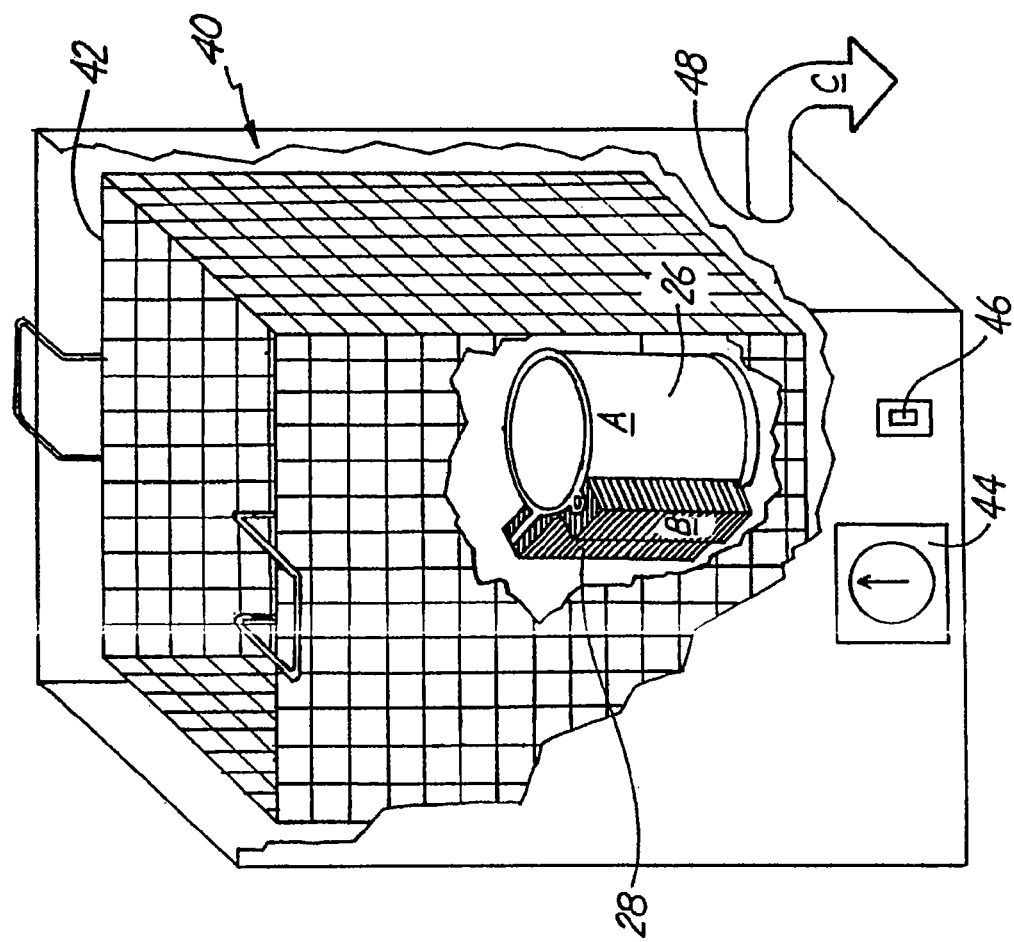
FIG. 2 is a perspective view (portions broken away) of the model of FIG. 1 in an alkaline bath used in practicing the process of the present invention.

After completion of the model 26, the support structure 28 is removed from the model 26 by soaking the model 26 with its attached support structure 28 in a bath 40 containing an alkaline solution C. In the embodiment shown in FIG. 2, bath 40 is an ultrasonic, temperature-controlled bath which contains a removable mesh basket 42 for holding the model 26. The temperature of bath 40 is set using a temperature control 44. The alkaline solution C is an aqueous solution that can be washed down the drain for disposal. The temperature of the solution C in bath 40 can be heated to speed dissolution of support material B. An ultrasonic frequency generator 46 having an on/off switch starts and stops the ultrasonic transmission. The ultrasonic frequency transmission generates air bubbles which assist in dissolving away the support material B by vibrating the model.

Model 26 remains in bath 40 until the support material B dissolves. The basket 42 is then removed from bath 40. The basket 42 can be placed in a sink and the solution C rinsed off of the model 26 with water and washed down the drain. Bath 40 has a drain 48 from which a plug is removed to drain the solution C from the bath 40.

As an alternative to removing support structure 28 from the model 26 by dissolving the alkali-soluble support material B in a bath, the support material may be dissolved using water jets operated by hand or by automation.

The base 14 may be removed from the model 26 before placing the model in the bath 40. Alternatively, the base 14 may remain adhered to model 26 as it is placed in bath 40. In the latter case, an alkali-soluble base may be desired, such as an alkali-soluble foam.

The alkali-soluble support material B must satisfy a large number of modeling criteria for the particular modeling system in which it is used, relating generally to thermal properties, strength, viscosity and adhesion. As to thermal properties, the alkali-soluble support material B must not deform at the temperature in the build envelope, so as to maintain structural fidelity of the model that it supports. It is therefore desired that the alkali-soluble support material B have a glass transition temperature (Tg) at least 10° C. above the build envelope temperature. Further, if the glass transition temperature of alkali-soluble support material B is lower than that of modeling material A, the rate of dissolution of alkali-soluble support material B may be increased by temperature control.

The alkali-soluble support material B must have a melt viscosity suitable for the modeling process. In a modeling system of the type described herein, the melt viscosity must be low enough at the liquifier temperature so that it can be extruded through the orifice of the liquifier as a generally continuous strand or bead and so that deposited strands or beads of alkali-soluble support material B have little melt strength, allowing them to lay flat rather than curl up. Melt viscosity is lowered by increasing the temperature in the liquifier. Too high a liquifier temperature, however, can cause material sitting idle in the liquifier to decompose. If decomposed, in the case of an extrusion head that has no positive cut-off mechanism, support material B will drain uncontrollably from the liquifier into the build envelope, a condition referred to as "ooze". In practice, viscosity may be measured by its inverse parameter, melt flow. A desirable melt flow index for alkali-soluble support material B is between about 1 g/10 minutes and about 10 grams/10 minutes, as measured pursuant to ASTM D1238, under a load of 1.2 kg at 230° C., and is preferably between about 5 grams/10 minutes to about 10 grams/10 minutes.

To properly support the model under construction, the alkali-soluble support material B must bond to itself (self-laminate) and bond weakly to modeling material A (co-laminate). Where the support structure is built up from the base, alkali-soluble support material B must additionally bond to the base 14. The acid content in alkali-soluble support material B of the present invention makes the material fairly sticky, so that it will adequately adhere to a base made of any number of materials. For example, a polyurethane foam base has been successfully utilized in the practice of the invention.

To produce an accurate model, alkali-soluble support material B must also exhibit little shrinkage upon cooling in the conditions of the build envelope, or, the shrink characteristics must match those of modeling material A. A shrink differential in the materials would cause stresses and bond failures along the model/support structure joint.

Alkali-soluble support material B must have sufficient mechanical strength in solid form to provide support to a model during its formation. The alkali-soluble support material B must resist forces by the modeling material A, or the model will exhibit undesirable curling and deformation. Additionally, alkali-soluble support material B, when supplied in filament or rod form, must be strong enough to be shipped without breaking. When supplied in filament form, alkali-soluble support material B must further have the strength and flexibility to be formed into a filament, be spooled and unspooled, and be fed through the extrusion apparatus without breakage. Similarly, alkali-soluble support material B supplied in filament form must have sufficient rigidity to not be deformed by compressive forces during feeding through the extrusion apparatus. A tensile strength on the order of 1000-5000 psi is typically appropriate for deposition modeling applications.

Solubility characteristics required of alkali-soluble support material B are that it be readily soluble in an alkaline solution (pH 7 or higher) that does not adversely affect the modeling material A. As used herein, a material is "soluble in an alkaline solution" if the material is substantially dissolvable and/or dispersible in a solution with a pH of about 7 or higher and a temperature ranging from about 25° C. to about 80° C. It is additionally desirable that the solution be non-toxic and non-flammable, so that it requires no special handling or disposal by users.

The alkali-soluble support material B of the present invention is comprised of a base polymer, which may include a first comonomer (which contains carboxylic acid) and a second comonomer that is polymerized with the first comonomer (e.g., via free-radical polymerization) to provide thermal and toughness properties suitable for deposition modeling. An alkyl methacrylate (including methyl, ethyl, propyl and butyl methacrylate), or a combination of alkyl methacrylates, is a suitable second comonomer. Other monomers may be used as the second comonomer, that achieve the thermal and toughness characteristics desired for the modeling system in which the alkali-soluble support material B will be used. A preferred base polymer is comprised of methacrylic acid as the first comonomer and methyl methacrylate as the second comonomer.

A desirable amount of the acid-containing first comonomer is 15-60 weight percent of the base polymer. The solubility of the alkali-soluble support material B is due to the carboxylic acid in the base polymer. As the acid content of the base polymer increases, the required alkalinity (pH) of the alkaline solution used to dissolve it decreases. Optionally, additional monomers can be incorporated into the base polymer.

The alkali-soluble support material B of the present invention may also include a plasticizer to attain rheological properties desired for the modeling process. Selection of an appropriate plasticizer depends on a number of factors. The plasticizer must plasticate the dry base polymer into a processable thermoplastic meeting the desired criteria. In addition, the plasticizer must be compatible with the base polymer. Compatibility is determined by polarity, dispersion and hydrogen bonding forces, as shown by Small's solubility parameters of 8.0 or higher, preferably 8.5 or higher (using Small's molar attraction constant method), or as shown by Hansen's solubility parameters of 17.0, preferably 17.5 or higher (from Hansen method described in Handbook of Solubility Parameters, CRC Press (1991). The plasticizer must not exhibit exudation in the form of an oily film on the plasticized polymer. The plasticizer must have a low vapor pressure at material processing and modeling temperatures, preferably less than 10 mm Hg at 200° C. and less than 20 mm Hg at 250° C. The plasticizer must additionally be hydrolyzable, soluble, emulsifiable or dispersable in an alkali solvating bath, pH 7 or higher.

A plasticizer reduces viscosity (i.e., increases the melt flow index) and also lowers the glass transition temperature of a polymer. As such, the concentration of plasticizer in the alkali-soluble support material B desirably provides the desired glass transition temperatures and melt flow indexes discussed above. For example, the thermoplastic soluble support material B desirably exhibit glass transition temperatures at least 10° C. above the build envelope temperatures. Similarly, the alkali-soluble support material B desirably exhibits a melt flow index ranging from about 1 gram/10 minutes to about 10 grams/10 minutes (preferably between 5 grams/10 minutes and 10 grams/10 minutes).

The concentration of plasticizer in the alkali-soluble support material B may depend on a variety of factors, such as the materials used for the modeling material A, the materials used for the base polymer and the plasticizer of the alkali-soluble support material B, the build envelope temperature, and the desired flow rates of the modeling material A and the alkali-soluble support material B. Examples of suitable concentrations of plasticizer in the alkali-soluble support material B range from about 0.01% to about 50% by weight, based on the total weight of the alkali-soluble support material B. Examples of particularly suitable concentrations of plasticizer in the alkali-soluble support material B range from about 5.0% to about 25% by weight, based on the total weight of the alkali-soluble support material B.

Plasticizers found to be compatible include plasticizers in the general classes of dialkyl phthalates, cycloalkyl phthalates, benzyl and aryl phthalates, alkoxy phthalates, alkyl/aryl phosphates, carboxylic acid esters, polyglycol esters, adipate esters, citrate esters, and esters of glycerin. Commercially available plasticizers with specific structure found to be compatible include:
Acetates:
cumyl phenyl acetate;
Glyceryl Triacetate, triacetin;
Adipates:
dibutoxy ethoxy ethyl adipate
dibutoxy ethyl adipate
di iso butyl adipate
Citrates:
tri-n-ethyl citrate;
acetyl tri-n-ethyl citrate;
tri-n-propyl citrate;
acetyl tri-n-propyl citrate;
tri-n-butyl citrate;
acetyl tri-n-butyl citrate;
Phthalates:
DBP, dibutyl phthalate (partial compatibility);
BBP, butyl benzyl phthalate (total compatibility);
DBEP dibutoxy ethyl phthalate (partial compatibility);
2 ethyl hexyl benzyl phthalate;
tetramethyl oxa onononyl benzyl phthalate;
Benzoates:
dipropylene glycol dibenzoate;
diethylene glycol dibenzoate;
50/50 blend dipropylene glycol dibenzoate and diethylene glycol dibenzoate;
1,4 cyclohexane dimethanol dibenzoate;
glyceryl tribenzoate;
cumyl phenyl benzoate;
neopentyl glycol dibenzoate;
pentaerythritol tetabenzoate;
Phosphates:
butyl phenyl diphenyl phosphate;
TCP, tricresyl phosphate;
2 ethylhexyl diphenyl phosphate;
isodecyl diphenyl phosphate;
C12, C16 alkyl diphenyl phosphate;
isopropylated triphenyl phosphate;
Polyglycols:
Polyethylene glycols;
Polypropylene glycols.

Particularly preferred plasticizers have high thermal stability, and include: p-t-butylphenyl diphenyl phosphate; butyl benzyl phthalate; 7-(2,6,6,8-tetramethyl-4-oxa-3-oxononyl) benzyl phthalate; C7/C9 alkyl benzyl phthalate; 2-ethylhexyl diphenyl phosphate; and isodecyl diphenyl phosphate.

Optionally, the alkali-soluble support material B may contain other components as well, such as filler materials. For example, inert fillers may be selected from a polymer filler group consisting of calcium carbonate, magnesium carbonate, glass spheres, graphite, carbon black, carbon fiber, glass fiber, talc, wollastonite, mica, alumina, silica, kaolin, whiskers and silicon carbide. Inorganic fillers such as soluble salts may also be used.

Techniques conventional in polymer chemistry are used to compound the component materials into alkali-soluble support material B. The formulation may be molded into rods, pellets or other shapes for use in the extrusion apparatus, or it may be used directly in the apparatus without prior solidification. Alternatively, the mixture may be solidified and then granulated, for supply to the extrusion apparatus in granulated form. For use in the modeling process shown and described herein, a granulated feedstock composition is processed through conventional extrusion apparatus to form continuous flexible filaments. Desirably, these filaments are wound in continuous lengths on a spool and dried. Alkali-soluble support material B in filament form is supplied to the extrusion apparatus 10 as described above. The filament 20 is typically of a very small diameter, on the order of 0.070 inches, and may be as small as 0.001 inches in diameter.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from general chemical suppliers such as the Sigma-Aldrich Chemical Company of Saint Louis, Mich., or may be synthesized by conventional techniques.

Example I

The alkali-soluble thermoplastic material contains 74% of the base polymer and 26% of butyl phenyl diphenyl phosphate plasticizer. The base polymer consists of a higher and a lower molecular weight copolymer of methacrylic acid and methyl methacrylate. The base polymer contains roughly 50% of the higher molecular weight copolymer and 50% of the lower molecular weight copolymer, plus or minus 5% of each. Each copolymer contains a 1:2 weight percent ratio of methacrylic acid to methyl methacrylate. The higher molecular weight copolymer is characterized by a high viscosity (low melt flow), and the low molecular weight copolymer is characterized by a low viscosity (high melt flow). Melt flow of the copolymers is measured by plasticizing each copolymer separately with 26 weight percent of the butyl phenyl diphenyl phosphate plasticizer. The melt flow index of the plasticized high molecular weight copolymer is in the range of 0.4 grams/10 minutes to 0.8 grams/10 minutes, as measured pursuant to ASTM D1238 under a 1.2 kilogram load at 230° C. The melt flow index of the plasticized low molecular weight copolymer is in the range of 28 grams/10 minutes to 35 grams/10 minutes. The resulting thermoplastic composition has a melt flow index of 5 grams/10 minutes to 6.5 grams/10 minutes and a glass transition temperature of about 90° C.

The alkali-soluble thermoplastic material is processed into a 0.070 inch diameter filament and wound on a spool. The filament is fed to a Stratasys FDM® 1650 or a Stratasys FDM® 2000 benchtop model machine. The molten alkali-soluble thermoplastic material is extruded from a liquifier having a temperature of 200° C. into a 70° C. build envelope onto a polyurethane foam base. The extruded alkali-soluble thermoplastic material has a road width of about 0.020 inches to about 0.040 inches and a road height (slice interval) of about 0.007 inches to about 0.020 inches. A model is built from ABS thermoplastic having a glass transition temperature of 104° C., using the alkali-soluble thermoplastic material to form supports. The model with the attached supports is placed into an ultrasonic cleaning bath (having a scanning frequency of 25-27 Hertz), containing an alkaline aqueous solution of approximately 98.7 weight percent water, 0.85 weight percent water softener, 0.30 weight percent pH adjuster and 0.15 weight percent surfactant, resulting in a pH of 11 to 13. The bath temperature is set to 70° C. (the bath temperature must remain lower than the glass transition temperature of modeling material A). In two hours time or less the supports are dissolved.

An alternative base polymer formulation combines the higher molecular weight 1:2 copolymer of methacrylic acid and methyl methacrylate with a lower molecular weight copolymer containing 40% methacrylic acid and 60% butyl methacrylate. A further alternative base polymer formulation uses acrylic acid as the first comonomer. The further alternative was found unacceptable for use in the Stratasys FDM® modeling machines, however, as it results in a base polymer having a lower glass transition temperature lower than the build envelope temperature of the machines.

Example II

The alkali-soluble thermoplastic material contains 79% (+/−5%) of the base polymer and 21% (+/−5%) of butyl phenyl diphenyl phosphate plasticizer. The base polymer consists of a 1:1 weight percent ratio of methacrylic acid to methyl methacrylate, having a molecular weight of 135,000 grams/mole. Prior to compounding the base polymer with the plasticizer, the base polymer is heated in a 220° C. oven at low pressure to rid the polymer of water. Heating at low pressure for 10-15 hours was found sufficient to dry the base polymer. The resultant dry polymer is in the form of granules, which are fed into a compounder with the plasticizer in a known manner. The resulting alkali-soluble thermoplastic material has a melt flow index in the range of 5 grams/10 minutes to 6.5 grams/10 minutes, as measured pursuant to ASTM D1238 under a 1.2 kilogram load at 230° C. The glass transition onset temperature of the alkali-soluble thermoplastic material is about 101.5° C. and the glass transition peak temperature is about 111° C.

As in Example I above, the alkali-soluble thermoplastic material is processed into a 0.070 inch diameter filament and wound on a spool. The filament is fed to a Stratasys FDM® 1650 or a Stratasys FDM® 2000 benchtop model machine. Molten alkali-soluble thermoplastic material is extruded from a liquifier having a temperature of 235° C. into a build envelope having a temperature of 70° C. to 80° C., onto a polyurethane foam base. The extruded alkali-soluble thermoplastic material has a road width of about 0.020 inches to about 0.040 inches and a road height (slice interval) of about 0.007 inches to about 0.020 inches. A model is built from ABS thermoplastic having a glass transition temperature of 104° C., using the alkali-soluble thermoplastic material to form supports. To dissolve the supports, the model is placed into an ultrasonic cleaning bath set to 70° C. and having a scanning frequency of 25-27 Hertz, containing an alkaline aqueous solution of approximately 98.7% water, 0.85% water softener, 0.30% pH adjuster, and 0.15% surfactant. In two hours time or less the supports are dissolved. The alkali-soluble thermoplastic material according to this example exhibits thermal properties, mechanical strength, viscosity, adhesion, solubility and processing characteristics suitable for three-dimensional modeling on the Stratasys filament-feed benchtop machines.

Example III

The alkali-soluble thermoplastic material has the same composition as in Example II above, but in this example the base polymer is not heated to release moisture. The alkali-soluble thermoplastic material is processed and extruded from a Stratasys FDM® machine as in Example II, and deposited to form a support structure for a model built of ABS thermoplastic. In this example, the alkali-soluble thermoplastic material exhibited a greater amount of "ooze" from the extrusion head than is desirable, but otherwise exhibited characteristics suitable for three-dimensional modeling. The "ooze" is attributable to water present in the composition. If used in a modeling system wherein the material dispenser has a positive cut-off mechanism, the "ooze" effect exhibited in the Stratasys FDM® machine would not occur and the material according to this Example III could be effectively utilized.

Example IV

Samples of alkali-soluble thermoplastic materials of the present invention were created with varying concentrations of plasticizer to compare the effects of the plasticizer on the glass transition temperatures and the melt flow indexes. The base polymers and the plasticizers used were the same as described in Example I. Table 1 provides the weight percent concentrations of the alkali-soluble thermoplastic materials of Examples IV(A)-Examples IV(M). As shown, the concentration of plasticizer was varied between the samples. Table 1 also provides the corresponding glass transition temperatures (Tg) and the melt flow indexes (MFI) of the alkali-soluble thermoplastic materials of Examples IV(A)-Examples IV(M). The melt flow indexes were tested pursuant to ASTM D1238 under a 1.2 kilogram load at 160° C., 230° C., or 270° C.

TABLE 1

| Composition | Weight Percent Base Polymer (*) | Weight Percent Plasticizer (*) | Tg (° C.) | MFI (160° C.) | MFI (230° C.) | MFI (270° C.) |
|---|---|---|---|---|---|---|
| Example IV(A) | 100 | 0 | 160 | | | |
| Example IV(B) | 98 | 2 | 156 | | | 1.1 |
| Example IV(C) | 97 | 3 | 154 | | | 1.2 |
| Example IV(D) | 96 | 4 | 147 | | | 1.6 |
| Example IV(E) | 95 | 5 | 145 | | | 2.5 |
| Example IV(F) | 93 | 7 | 142 | | | 3.4 |
| Example IV(G) | 90 | 10 | 134 | | | 6.0 |
| Example IV(H) | 83 | 17 | 116 | | 1.7 | |
| Example IV(I) | 81 | 19 | 111 | | 2.3 | |
| Example IV(J) | 79 | 21 | 109 | | 3.0 | |
| Example IV(K) | 75 | 25 | 100 | | 6.2 | |
| Example IV(L) | 65 | 35 | 74 | | 35.0 | |
| Example IV(M) | 55 | 45 | 49 | 5.1 | | |

(*) Based of the total weight of the alkali-soluble thermoplastic material.

The data in Table 1 illustrates the effects of the plasticizer concentration on the glass transition temperature and the melt flow index of the alkali-soluble thermoplastic materials. In general, as the concentrations of plasticizer in the alkali-soluble thermoplastic materials increase, the glass transition temperatures decrease and the melt flow indexes increase. As such, varying the plasticizer concentration provides a trade-off between the glass transition temperature and the melt flow index.

For the base polymer and plasticizer used for Examples IV(A)-Examples IV(M), the glass transition temperatures ranged from about 49° C. (45% plasticizer) to about 160° C. (no plasticizer), and were generally inversely linear to the concentration of plasticizer. As discussed above, the alkali-soluble support materials of the present invention desirably exhibit glass transition temperatures at least 10° C. above the build envelope temperatures. As such, when using high build envelope temperatures (e.g., 100° C. or higher), alkali-soluble thermoplastic materials with low concentrations of plasticizer are preferred (e.g., 25% or less) to allow the alkali-soluble thermoplastic materials to exhibit higher glass transition temperatures.

With respect to the melt flow index tested at 230° C., the data in Table 1 shows that the melt flow index increases generally in an exponential manner relative to the concentration of plasticizer. An increase from 25% to 35% plasticizer caused the melt flow index to increase from about 6 grams/10 minutes to about 35 grams/10 minutes. As discussed above, a melt flow index ranging from about 1 gram/10 minutes to about 10 grams/10 minutes is preferred. As such, a melt flow index of about 6 grams/10 minutes is considered acceptable conditions for extruding the material. However, a melt flow index of about 35 grams/10 minutes may cause the desired physical properties to potentially deteriorate.

As shown in Table 1, plasticizer concentrations of about 25% or less (Examples IV(A)-Examples IV(K)) provide glass transition temperatures of about 100 C or greater, and melt flow indexes of about 6 grams/10 minutes or less at 230° C. Such plasticizer concentrations provide acceptable physical characteristics for the alkali-soluble thermoplastic materials of the present invention.

Although the present invention has been described with reference to preferred embodiments, workers skilled in the art will recognize that changes may be made in form and detail without departing from the spirit and scope of the invention. For example, it will be appreciated that innumerable modifications may be made to the modeling process. It will further be appreciated that various modifications may be made to the composition. Also, the thermoplastic material of the present invention could be used to create an alkali-soluble three-dimensional object having usefulness in various molding processes. For example, the alkali-soluble material can form a dissolvable master core in a cast or injection process. The alkali-soluble material can likewise be used to create a mold (by deposition modeling or otherwise), which mold can later be dissolved out of an object formed by molding processes.

The invention claimed:

1. A support material feedstock for making a support structure for a three-dimensional object using an additive processing technique, the support material feedstock comprising:
    a composition comprising:
        at least one copolymer comprising:
            a plurality of pendent carboxylic acid groups derived from monomers comprising methacrylic acid; and
            a plurality of pendent ester groups derived from alkyl methacrylates; and at least one plasticizer, wherein the composition is soluble in an alkaline aqueous solution; and a filament geometry configured to be received by a filament-fed extrusion system configured to make the support structure in a layer-by-layer manner in coordination with the three-dimensional object using the additive processing technique.

2. The support material feedstock of claim 1, wherein the alkyl methacrylate comprises methyl methacrylate.

3. The support material feedstock of claim 1, wherein the composition consists essentially of the at least one copolymer and the at least one plasticizer.

4. The support material feedstock of claim 1, wherein the composition exhibits a melt flow index ranging from of about 1 gram/10 minutes to about 10 grams/10 minutes when tested pursuant to ASTM D1238 under a 1.2 kilogram load at 230° C.

5. The support material feedstock of claim 1, wherein the at least one plasticizer constitutes from about 10% by weight to about 30% by weight of the composition, based on a total weight of the composition.

6. The support material feedstock of claim 1, wherein the at least one plasticizer comprises an aromatic plasticizer.

7. A method of forming the support material feedstock of claim 1, the method comprising:

providing the at least one copolymer wherein the plurality of pendent carboxylic acid groups constitute from about 15.0% to about 60.0% by weight of pendent groups of the copolymer, based on a total weight of the pendent groups of the at least one copolymer;

combining the at least one copolymer with the at least one plasticizer to form a composition, the at least one plasticizer constituting from about 10% by weight to about 30% by weight of the composition, wherein the composition is soluble in an alkaline aqueous solution; and forming the support material feedstock from the composition, the formed support material feedstock having a filament geometry that is configured to be received by a filament-fed extrusion system configured to make the support structure in a layer-by-layer manner in coordination with a three-dimensional object using an additive processing technique.

8. The method of claim 7, and further comprising drying the formed feedstock to remove moisture from the formed feedstock.

9. The method of claim 7, and further comprising winding successive portions of the formed feedstock onto a spool that is configured to supply the formed feedstock to the filament-fed extrusion system.

10. A method of building a three-dimensional object with an extrusion system, the method comprising:

heating a build envelope of the extrusion system to one or more elevated temperatures;

dispensing a thermoplastic material in the heated build envelope using an additive processing technique to form the three-dimensional object in a layer-by-layer manner, the three-dimensional object having at least one overhanging feature;

feeding the support material feedstock of claim 1 to an extrusion head of the extrusion system;

melting the support material feedstock in the extrusion head to a flowable state;

dispensing the melted support material in the heated build envelope in coordination with the dispensing of the thermoplastic material, using the additive processing technique to form a support structure in a layer-by-layer manner configured to support the at least one overhanging feature of the three-dimensional object; and exposing the formed support structure to an alkaline aqueous solution to at least partially remove the formed support structure from the formed three-dimensional object.

11. The method of claim 10, wherein the support material feedstock comprises a filament geometry.

12. The method of claim 10, wherein the at least one plasticizer constitutes from about 10% by weight to about 30% by weight of the composition of the support material, based on a total weight of the composition of the support material.

\* \* \* \* \*